United States Patent
Walker et al.

(10) Patent No.: US 8,456,425 B2
(45) Date of Patent: Jun. 4, 2013

(54) SELF-ADAPTING KEYPAD

(75) Inventors: Keith R. Walker, Austin, TX (US); William C. Freeman, Marietta, GA (US); Jeffrey D. Amsterdam, Marietta, GA (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1363 days.

(21) Appl. No.: 12/022,636

(22) Filed: Jan. 30, 2008

(65) Prior Publication Data

US 2009/0189864 A1    Jul. 30, 2009

(51) Int. Cl.
*G06F 3/02* (2006.01)

(52) U.S. Cl.
USPC ............ 345/169; 345/156; 345/168; 345/173

(58) Field of Classification Search
USPC .......................................... 345/156, 168–178
See application file for complete search history.

(56) References Cited

U.S. PATENT DOCUMENTS

| | | | | |
|---|---|---|---|---|
| 5,523,754 | A | 6/1996 | Eisen et al. | 341/20 |
| 5,963,671 | A * | 10/1999 | Comerford et al. | 382/230 |
| 6,616,358 | B1 | 9/2003 | Chen et al. | 400/472 |
| 7,186,041 | B2 * | 3/2007 | Harley | 400/486 |
| 2002/0093690 | A1 | 7/2002 | Satoh | 358/400 |
| 2003/0074647 | A1 | 4/2003 | Andrew | |
| 2004/0212590 | A1 | 10/2004 | Koo et al. | 345/156 |
| 2005/0225538 | A1 | 10/2005 | Verhaegh | 345/173 |
| 2006/0209020 | A1 | 9/2006 | Scheiblhuber | 345/156 |
| 2007/0086825 | A1 | 4/2007 | Min | 400/472 |
| 2007/0200827 | A1 * | 8/2007 | Samal | 345/168 |
| 2008/0088599 | A1 * | 4/2008 | Gunn et al. | 345/173 |

FOREIGN PATENT DOCUMENTS

EP    1302850 A2    4/2003

OTHER PUBLICATIONS

On-line Personalization of a Touch Screen Based Keyboard: J. Himberg, J. Hakkila, P. Kangas, J. Mantyjarvi; IUI 2003. Jan. 12-15, 2003, Miami, Florida Touch-It—Virtual Keyboard; http://powin.com/Utilities/Shell_Extensions/Touch_It_Virtual_Keyboard/index.htm.

* cited by examiner

*Primary Examiner* — Christopher E Leiby
(74) *Attorney, Agent, or Firm* — Mark C. Vallone

(57) ABSTRACT

A method, apparatus and computer-usable medium for implementing a virtual keyboard for use with small input devices. A circular keyboard can be graphically displayed, in response to a user input by a user via a small input device. A circular and centrally located key can be graphically located and displayed within the center of the circular keyboard, wherein character keys radiate outward from the centrally located key (i.e., the "central key"). Character keys that are most commonly utilized by the user are preferably located closed to the circular and centrally located key within the circular keyboard. Character keys least commonly utilized by the user are preferably located at the edges of the keyboard, thereby permitting the circular keyboard to function as a self-adapting virtual keyboard for use with small input devices based on the usage of the keyboard by the user.

23 Claims, 7 Drawing Sheets

SELF-ADAPTING KEYPAD

TECHNICAL FIELD

Embodiments are generally related to data-processing systems and methods. Embodiments also relate in general to the field of computers and similar technologies, and in particular to software and hardware components utilized in this field. In addition, embodiments relate to user input devices, such as keyboards, keypads, and so forth.

BACKGROUND OF THE INVENTION

With the development of compacting mobile computing technology, such as PDA (Personal Digital Assistant) devices, cellular telephones, portable media players, and so forth, current mobile devices are equipped with various functions, such as internet browsing, sending emails, camera, or games. As the functions of the mobile computing devices expand, the input interface becomes a critical issue. For example, the dimensions of current mobile devices tend to be minimized, and therefore the input interface is limited to number keyboards only or even several function keys. While the user intends to enter various alphabetic and numerical functions, such as letters, numbers, symbols, emoticons, etc., the only available approach is to enter via those number keyboards. Usually, one particular number key will represent several alphabets, and the user has to select the desired alphabet, which is an inefficient and time-consuming process often involving entering data into an options screen to change back and forth among the alphabets. Moreover, current mobile computing devices are often provided, for example, with gaming options and other applications such as streaming video and interactive texting. The keyboard configuration required for game playing, for example, is usually different from that of the conventional mobile computing device. The user, however, will also be restricted to the current available number keyboards while playing the game or utilizing an application via the mobile computing device, which significantly discourages the user from continued use of the application.

Additionally, user input areas for small portable devices such as cell phones, PDAs and media devices are inefficient and prone to input error. For most mobile devices, a standard QWERTY keyboard apparatus (virtual or physical) can be used for input. Such a keyboard was designed for two handed input with spacing between keys matching that of spacing between human fingers. Various layouts with small keys or multiple displays have been implemented in small devices; however, these are usually adaptations of the QWERTY keyboard layout and as such not optimized for input with less than two hands.

The optimization of keyboard layout for mobile devices should take into account research into the functioning of the human eye and human information processing. The following except is offered as a reference:

"From physiological studies we know several basic facts about how the eye processes information and about the physical constraints that limit how this information is presented to the brain. During a fixation, the eye has access to three regions for viewing information: the foveal, parafoveal, and peripheral. The foveal region is the area that we think of as being in focus and includes 2 degrees of visual angle around the point of fixation, where 1 degree is equal to three or four letters (thus, six to eight letters are in focus). The parafoveal region extends to about 15 to 20 letters, and the peripheral region includes everything in the visual field beyond the parafoveal region. The fovea is concerned with processing detail, with anything beyond producing a marked drop in acuity; words presented to locations removed from the fovea are more difficult to identify" (Rayner & Sereno, 1994). A copy of the unabridged article is available at the following website as a reference:

http://www.readingonline.org/research/eyemove.html

Most, if not all, input apparatuses for small devices are variations of the standard keyboard or the number pad. These input apparatuses perform poorly when operated with one or two fingers as required by space constrained mobile devices. Circular and semi-circular inputs apparatuses are known in the art; however these apparatuses are designed for two finger or greater input and lack the dynamic rearrangement features required for efficient input on mobile devices.

Therefore, there is a need for an improved mobile computing input interface that a user can utilize more conveniently. There is also a need for an improved input interface that facilitates the minimization of the mobile computing device. It is believed that the embodiments described in greater detail herein offer a solution to these current drawbacks.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for providing a virtual self-adapting keyboard.

It is a further aspect of the present invention to provide for a method, system and computer-usable medium for providing a circular keyboard for use with small input devices.

The aforementioned aspects and other objectives and advantages can now be achieved as described herein. A method, apparatus and computer-usable medium are described herein for implementing virtual keyboards for use with small input devices. A circular keyboard can be graphically displayed, in response to a user input by a user via a small input device. A circular and centrally located key can be graphically positioned and displayed within the center of the circular keyboard, wherein character keys radiate outward from the circular and centrally located key (i.e., the "central key") Character keys that are most commonly utilized by the user are preferably located closer to the circular and centrally located key within the circular keyboard. Character keys least commonly utilized by the user are preferably located at the edges of the keyboard, thereby permitting the circular keyboard to function as a self-adapting virtual keyboard for use with small input devices based on the usage of the keyboard by the user.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
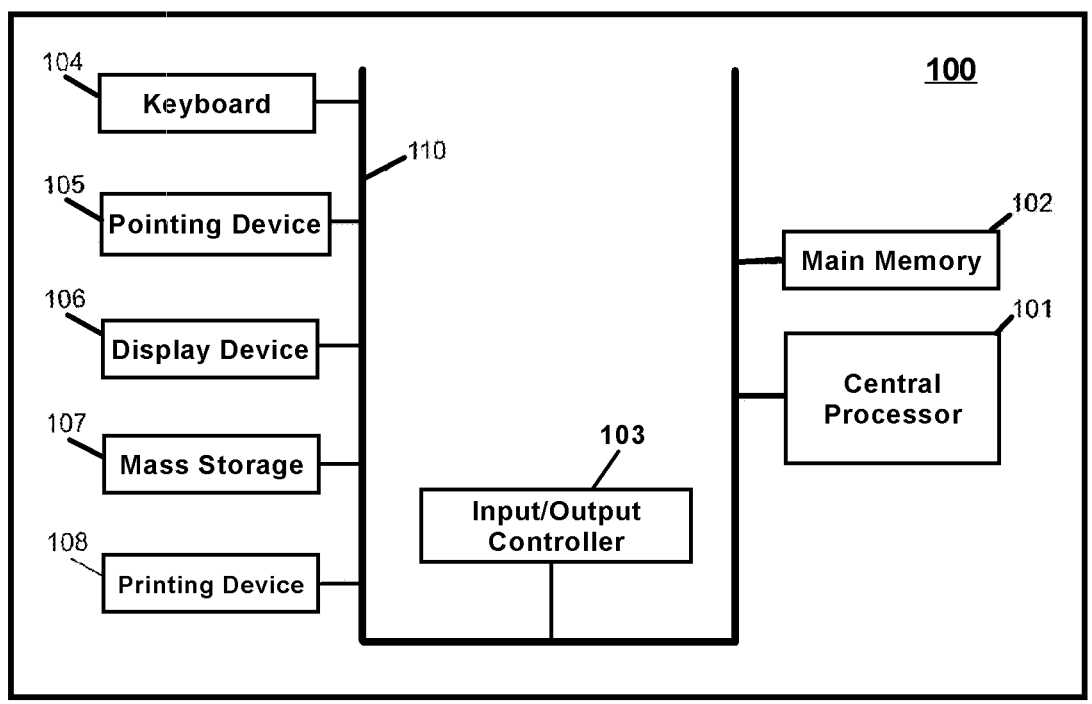
FIG. 1 illustrates a schematic view of a computer system in which the present invention may be embodied.
Figure 2:
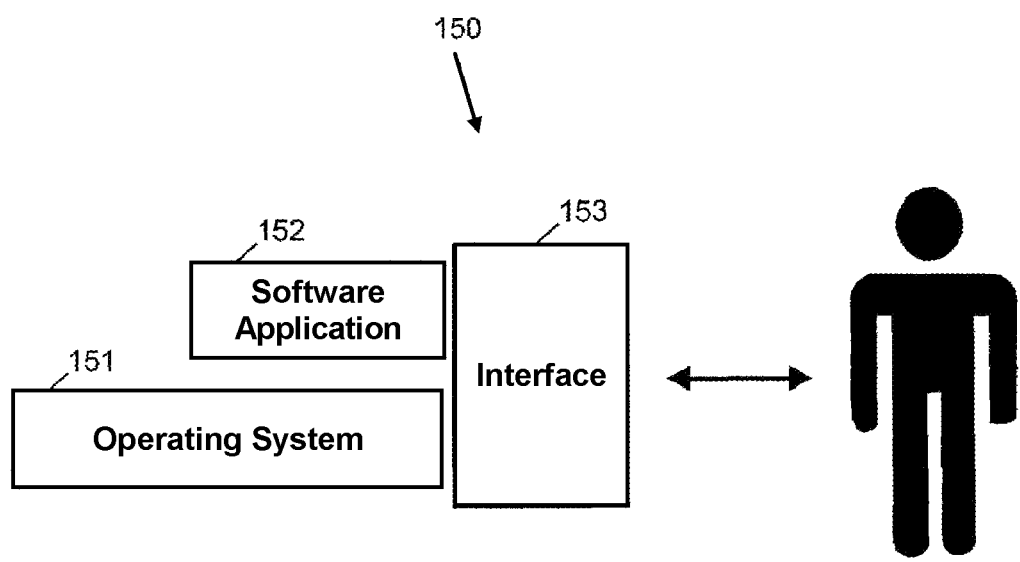
FIG. 2 illustrates a schematic view of a software system including an operating system, application software, and a user interface for carrying out the present invention.
Figure 3:
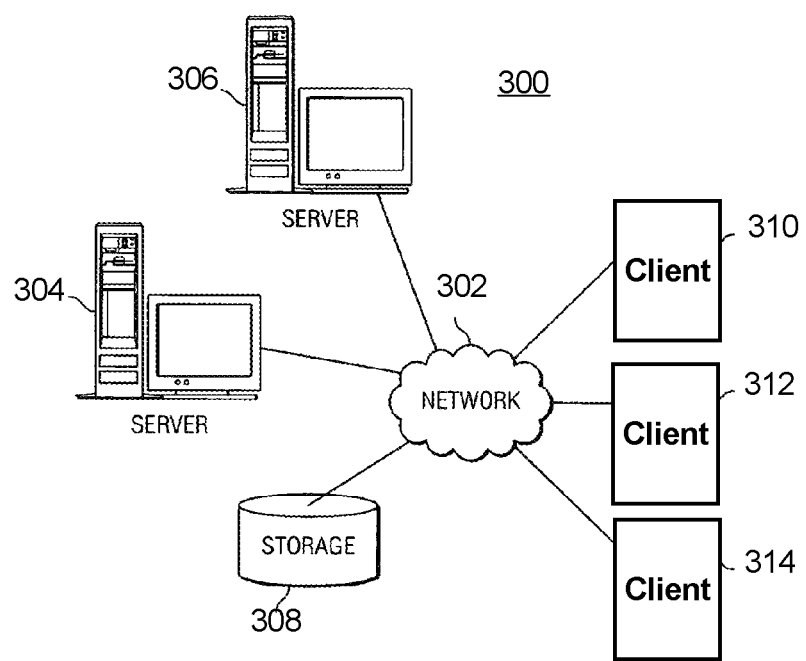
FIG. 3 depicts a graphical representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing apparatus 100 as desired. As illustrated, the various components of the data-processing apparatus 100 communicate through a system bus 110 or similar architecture. It can be appreciated that data-processing apparatus 100 may implemented in the context, a desktop computer, computer workstation, a server, a laptop computer, and any number of small input devices, such as mobile computing devices, including cellular telephones, PDA (Personal Digital Assistant), portable medial players, and so forth.

Illustrated in FIG. 2, a computer software system 150 is provided for directing the operation of the data-processing apparatus 100. Software system 150, which is stored in main memory 102 and on mass storage 107, generally includes a kernel or operating system 151 and a shell or interface 153. One or more application programs, such as application software 152, may be "loaded" (i.e., transferred from mass storage 107 into main memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate the session. In an embodiment, operating system 151 and interface 153 can be implemented in the context of a "Windows" system or another type of operation system such as, for example, Linux, etc. Application module 152, on the other hand, can include instructions, such as the various operations described herein with respect to the various components and modules described herein, such as, for example, the method 600 depicted in FIG. 6.

FIG. 3 depicts a graphical representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing apparatus 100. Network 302 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Thus, clients 310, 312, 314, can be implemented as devices such as personal computers, computer workstations, PDA's, cell phones, portable media players, and so forth. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In the depicted example, network data processing system 300 can constitute the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). Network 300 can also be implemented in the context of a wireless network, such as a cellular telephone network, Wi-Fi network, and so forth. The configurations depicted in FIGS. 1-3 are intended to serve as an example, and not as an architectural limitation for different embodiments of the present invention.

The following description is presented with respect to embodiments of the present invention, which can be embodied in the context of a data-processing system such as data-processing apparatus 100, computer software system 150 and data processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments which follows is for purposes of illustration and not considered a limitation.

Figure 4:
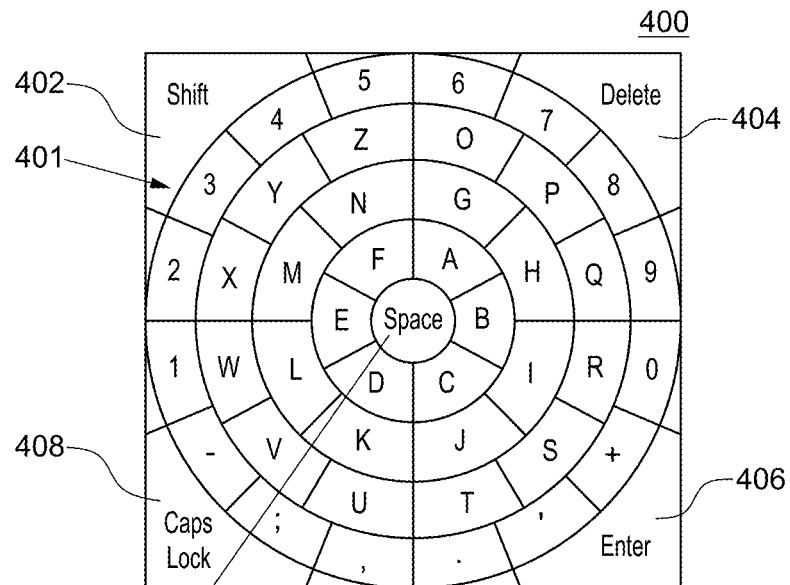
FIG. 4 illustrates a virtual keyboard apparatus that can be adapted for use with a small input device in order to improve the speed and accuracy of user input to such a small input device, in accordance with a preferred embodiment.
Figure 5:
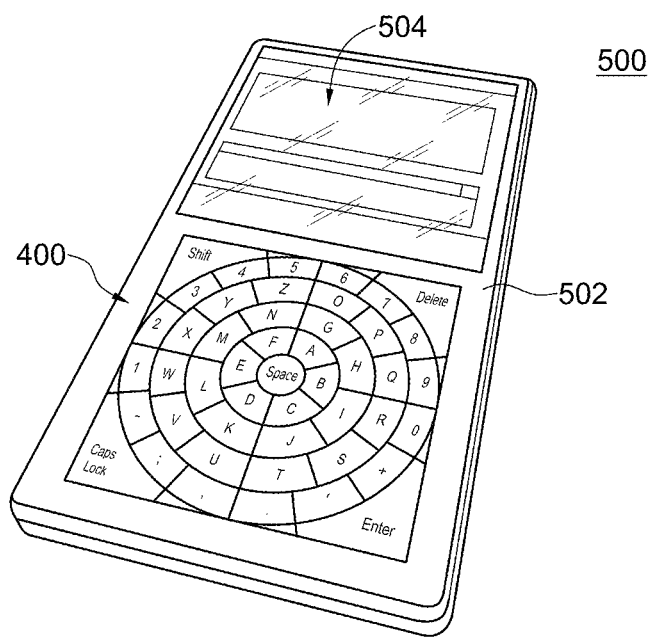
FIG. 5 illustrates a small input device adapted for use with the virtual keyboard apparatus depicted in FIG. 4, wherein the small input device includes a display screen and a rigid shell in accordance with a preferred embodiment.

FIG. 4 illustrates a virtual keyboard apparatus 400 that can be adapted for use with a small input device (e.g., input device 500 depicted in FIG. 5) in order to improve the speed and accuracy of user input to such a small input device, in accordance with a preferred embodiment. FIG. 5 illustrates a small input device 500 adapted for use with the virtual keyboard apparatus 400, and including a display screen 504 and a rigid shell 502 in accordance with a preferred embodiment. Note that in FIGS. 4-5, identical or similar parts or elements are generally indicated by identical reference numerals. Note that display screen 504 is analogous to the display device 106 depicted in FIG. 1, and the small input device 500 is analogous to the data-processing apparatus 100 depicted in FIG. 1, albeit on a smaller scale. It can be appreciated that the display screen 504 (and analogous display device 106) can be implemented as a touch screen display.

The virtual keyboard apparatus 400 can be implemented as a keyboard displayed on a small touch screen, a thumbstick operated keyboard with an associated visual display. The virtual keyboard apparatus 400 can be alternatively implemented in the context of keys with the ability to display characters (e.g., using known OLE technology or another method). Virtual keyboard apparatus 400 can be implemented with a substantially circular keypad 401, having keys such as number keys 1, 2, 3, etc. and letter keys A, B, C, D, etc., along with keys providing other characters such as colon, semicolon, period, plus and minus signs, and so on. A centrally located circular central key 410 can be implemented at the center of the circular keypad 401 with character keys radiating from the central key 410. The central key 410 may be, for example, a key such as a space key, an enter key, or another type of preferred key. In the embodiment disclosed herein, a space key is shown as the central key 410. In other embodiments, however, the central key 410 may be another type of key, such as, for example, an enter key. The most commonly utilized characters can be placed closest to the central key 410 and the least commonly used characters positioned on the edge of the circular keypad 401 forming a part of the overall virtual keyboard apparatus 400. Examples of such least commonly utilized keys, include, for example, shift key 402, delete key 404, enter key 406, and caps lock key 408. For devices that utilize a display and thumbstick (or button) for input, a cursor can be programmed to return to the central key 410 after each user input.

The virtual keyboard apparatus 400 is therefore optimized for single finger input by placing the keys most commonly used around a central point (e.g., central key 410) and placing the keys used less often further out from the center. In addition, this virtual keyboard apparatus 400 may modify the layout by relocating keys based on usage patterns to optimize key placement for frequently used keys. Such adaptive measures enable the user to input text on small devices faster than current known input apparatus.

The virtual keyboard apparatus 100 is therefore optimized for single finger input by placing the keys most commonly used around a central point (e.g., central key 410) and placing the keys used less often further out from the center. In addition, this virtual keyboard apparatus 100 may modify the layout by relocating keys based on usage patterns to optimize key placement for frequently used keys. Such adaptive measures enable the user to input text on small devices faster than current known input apparatus.

A circular presentation for smaller key layouts is advantageous due to the way the human eye sees information. It is known that the human eye focuses on a singular point and darts around that point filling in background information. Standard keyboard layouts such as QWERTY and Dvorak require memorization for maximum efficiency. Once a keyboard becomes smaller than the hand, however, this system is inefficient and even with memorization most users must look at the keys to use them. By organizing the keyboard such that the most common keys are arranged circularly around a point, memorization becomes unnecessary since the eye can find the keys quickly, and the distance traveled to any key is less than in known layouts.

Since most users must look at smaller device keyboards to quickly input text the benefits of memorization are lessened. Additional advantages of this approach include the adaptability for both different languages and optimization for users that operate keyboards or communicate differently from the majority of known users. Further advantages of the virtual keyboard apparatus 400 exist for task oriented input tasks, such as interacting with HTML by leveraging current and future display technology to dynamically modify the keyboard layout and optimally placing keys based on the user's current input type.

Most handheld devices do not conform to the rectangular shape of the standard keyboard, yet they implement a standard keyboard layout for input. This prevents optimization of both ergonomics, aesthetics and may reduce screen space for entered text. The virtual keyboard apparatus 400, on the other hand, can fit to almost any proportion or device design and function. The virtual keyboard apparatus 400 is likely of most value to users who do not memorize keyboard layouts and do not input on virtual devices with regularity. Such users likely include mobile device "Luddites" with a limited typing ability and who "hunt and peck" when typing.

It is known that the human eye focuses on a singular point and fills in information around that point by rapidly scanning and processing information close to that point. Virtual keyboard apparatus 400 thus represents a significant enhancement over the standard layout of keys. Improved efficiency results from a keyboard layout that may be rapidly processed by the human eye. By placing the keys most needed around the central point on the keyboard, the eye may locate a needed key faster than traditional keyboard layouts.

Figure 6:
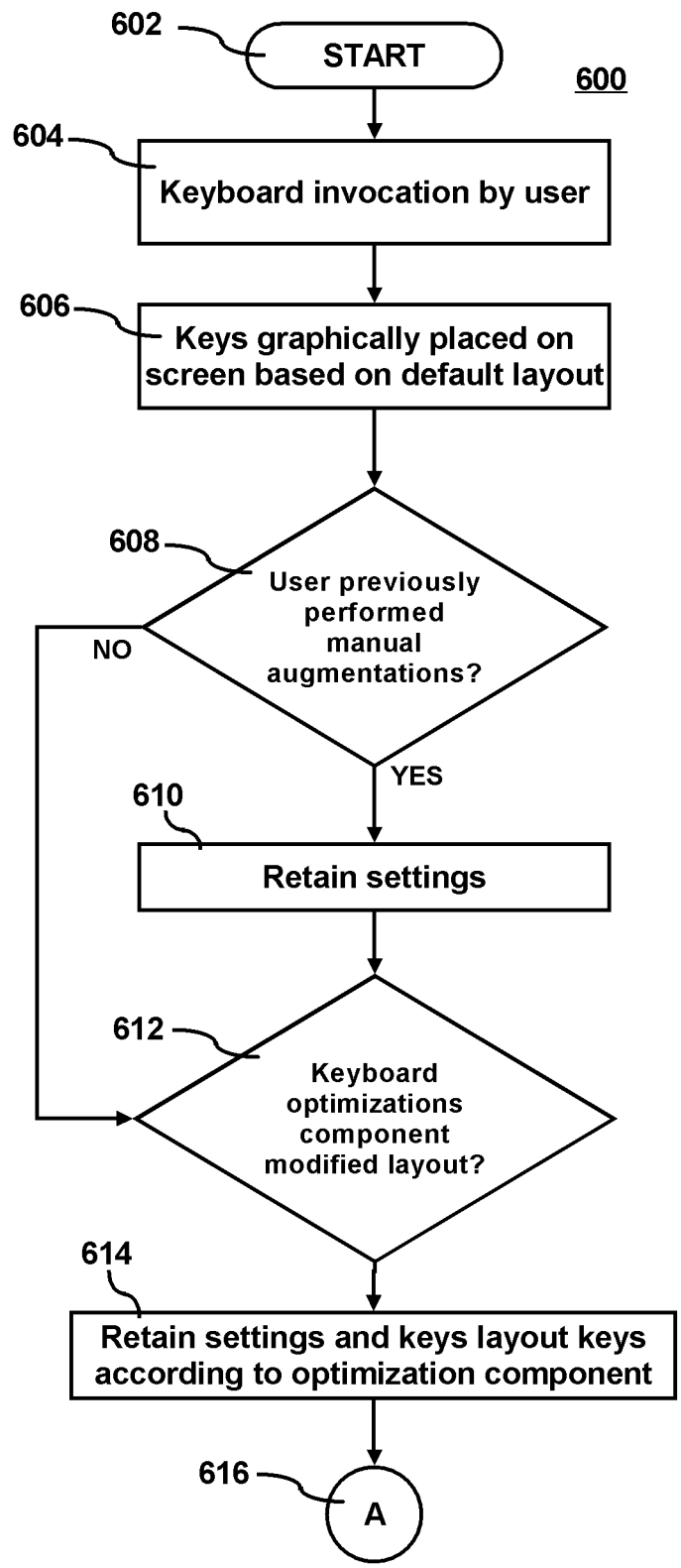
FIGS. 6, 7, and 8 respectively illustrate flow charts depicting methods for implementing the virtual keyboard apparatus of FIG. 4, in accordance with a preferred embodiment.
Figure 7:
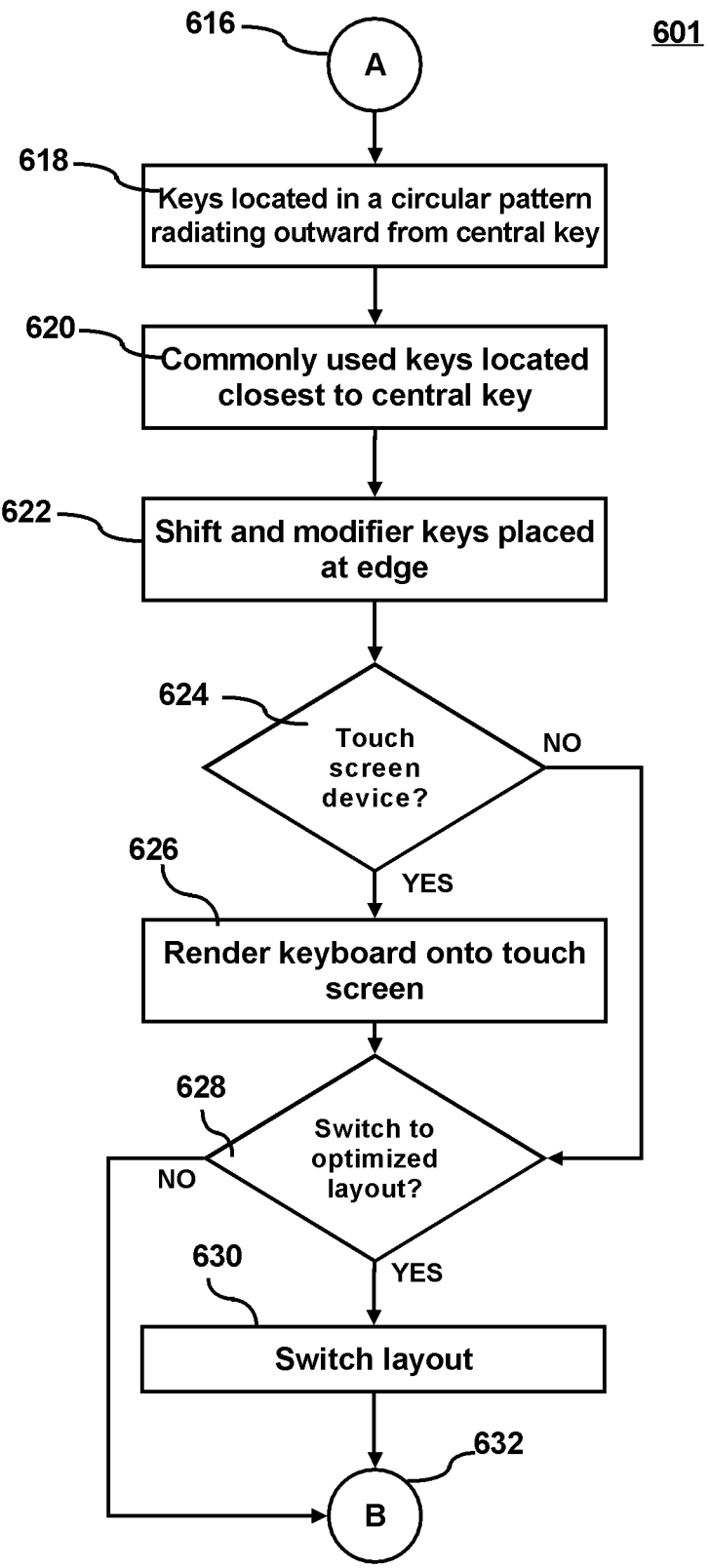
Figure 8:
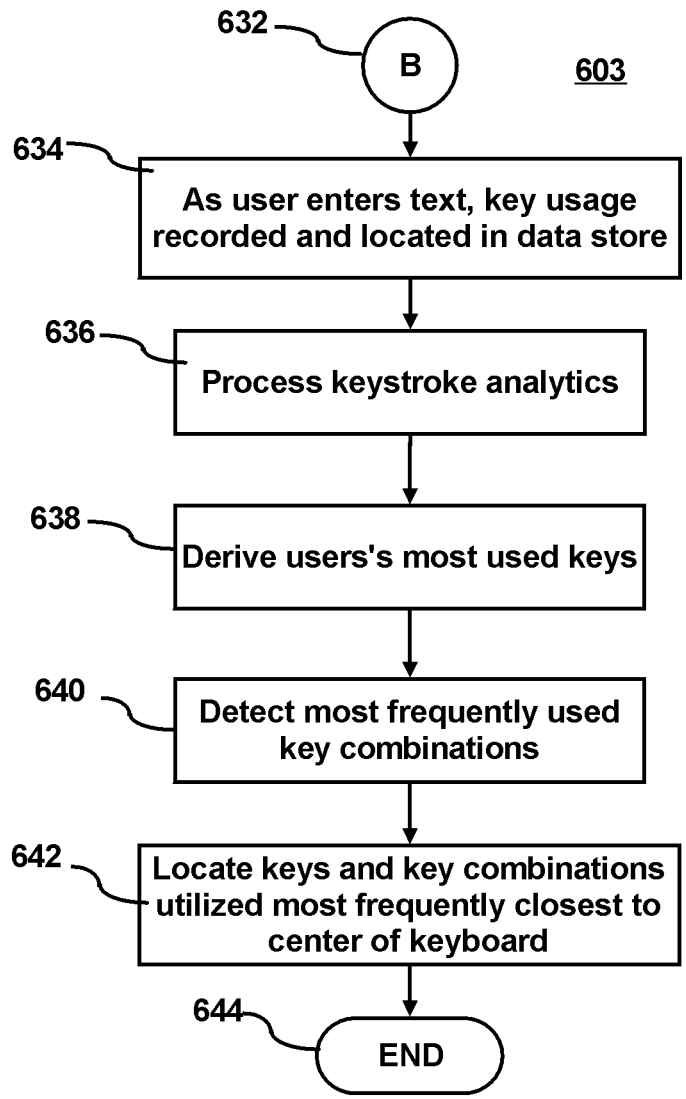

FIGS. 6, 7, and 8 respectively illustrate a flow chart of operations depicting methods 600, 601, and 603 for implementing the virtual keyboard apparatus 400, in accordance with a preferred embodiment. Note that methods 600, 601 and 603 can be implemented in the context of or in association with a computer-useable data storage medium that contains a program product. The methods 600, 601, and 603 depicted in FIGS. 6, 7 and 8 can also be implemented in a computer-usable data storage medium containing a program product.

Programs defining functions of the present invention can be delivered to a data storage system or a computer system via a variety of data storage media, which include, without limitation, non-writable data storage media (e.g., CD-ROM), writable data storage media (e.g., hard disk drive, read/write CD-ROM, optical media), and system memory such as but not limited to Random Access Memory (RAM). It should be understood, therefore, that such data storage media when storing computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the methods 600, 601 and 603 described herein can be deployed as process software in the context of a computer system or data-processing system as that depicted in FIGS. 1-3 and the virtual keyboard apparatus 400 and small input device 500 respectively illustrated in FIG. 4-5.

A preferred implementation of methods 600, 601 and 603 generally includes two key areas for providing the virtual keyboard apparatus 400 described above. The first area involves operations generally required for keyboard layout. Such operations can include, but are not limited to, layout and application specific layout operations. The second area for providing the virtual keyboard apparatus 400 involves keyboard optimization. Thus, as indicated at block 602, the process begins.

Keyboard Layout Configuration

As indicated at block 604, upon keyboard invocation (e.g., touch screen), an operation can be initiated in which keys are placed on the screen as previously described based on a particular default layout, as indicated thereafter at block 606. If the user has performed manual augmentations to the layout, as illustrated at block 608, those settings are retained as indicated at block 610, and the layout is affected accordingly and the operations continue. If the user had not performed manual augmentations to the layout then the process continues without such manual augmentations. Additionally, if the keyboard optimization component has modified the layout, as depicted at block 612, those settings can be retained and keys laid out according to the optimization component as indicated at block 614. The process then continues, as indicated by continuation block 616.

Embodiments may vary, but in general user requested augmentations should take precedence over automatic keyboard optimizations. A user may opt to disable optimization mutations on a per application basis and may still manually configure the key layout. A user may also desire to disable the optimization feature in several applications. For example, in a gaming application the user may only need a limited number of keys and expect certain keys to be in specific locations for input.

Layout

After acquiring the proper configuration, the keys of virtual keyboard apparatus 400 can be located in a circular fashion radiating outward from the central space button or key 410 as depicted at block 618 in FIG. 7. Unless prevented by user augmentation, the most commonly used keys are placed closest to the center and the less commonly used keys are placed towards the edge of the keyboard as indicated at block 620. Embodiments may vary, but in the preferred embodiment, the shift and other modifier keys are preferably placed in the corners as indicated at block 622 and as described earlier. Following the operation depicted at block 622, an operation can be processed for determining if a touch screen is being utilized as indicated at block 624. In touch screen devices with one screen for input and display, when a keyboard is required, the keyboard can be rendered onto the screen as indicated thereafter at block 626, leaving enough room for textual display and the keys activated for textual input.

Application Specific Layout

Each application may have a specific layout. For example, a portable HTML editing program may include a different optimal key layout compared to that of a chat client. In the preferred embodiment, as the user switches applications the keyboard layout may switch to an optimized layout for that application as indicated respectively at blocks 628 and 630. The user may, however, modify the layout for individual applications and the optimization component may optimize the layouts for each application. The process then continues, as indicated at block 632

Keyboard Optimization

Keyboard optimization is illustrated by the method 603 depicted in FIG. 8. As the user enters text, their key usage can be recorded and placed in a data storage location as indicated at block 634. Keystroke analytics for each application can be used to derive the individual user's most used keys for each potential application specific keyboard layout as depicted at blocks 636 and 638. The analytics may vary by embodiments, but most embodiments should detect the most frequently used keys, and the most frequently used key combinations as illustrated thereafter at block 640. Keys and key combinations used more often should be placed closer to the center of the keyboard as described at block 642. For example, a common key combination in a document writing program may be "t-h-e", and as such those keys should be placed close to the center of the keyboard. In the preferred embodiment a user may enable or disabled the keyboard optimization component. The process can then terminate, as depicted at block 644.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
    a mobile computing device displaying a graphical substantially circular keypad comprising a plurality of keys on a screen of the mobile computing device, wherein the plurality of keys comprises a space key and an enter key, and wherein the mobile computing device displaying the graphical substantially circular keypad comprises:
       the mobile computing device displaying a circular central key within a center of the graphical substantially circular keypad, wherein the circular central key is one of the space key and the enter key; and
       the mobile computing device displaying the plurality of keys other than the circular central key in a default key layout as modified according to automatic optimizations that are retained in settings in the mobile computing device, wherein the displayed plurality of keys other than the circular central key radiates outwardly from the circular central key;
    the mobile computing device detecting a subset of the plurality of keys that is most commonly utilized on the mobile computing device, and a subset of the plurality of keys that is most commonly utilized in combination on the mobile computing device, wherein the detected subset of the plurality of keys that is most commonly utilized on the mobile computing device and the detected subset of the plurality of keys that is most commonly utilized in combination on the mobile computing device are displayed closer to the circular central key within the graphical substantially circular keypad than a subset of the plurality of keys that is least commonly utilized on the mobile computing device in the default key layout as modified according to the automatic optimizations; and the mobile computing device modifying a layout of the graphical substantially circular keypad by relocating a subset of the plurality of keys based on usage patterns.

2. The method of claim 1, further comprising:

the mobile computing device analyzing a usage of the plurality of keys in order to detect the subset of the plurality of keys that is most commonly utilized on the mobile computing device and the subset of the plurality of keys that is most commonly utilized in combination on the mobile computing device.

3. The method of claim 1, wherein the mobile computing device displaying the plurality of keys other than the circular central key in the default key layout as modified according to the automatic optimizations comprises:

the mobile computing device displaying the plurality of keys other than the circular central key in the default key layout as modified according to the automatic optimizations and as modified according to user augmentations that are retained in settings in the mobile computing device and that take precedence over the automatic optimizations in modifying the default key layout.

4. The method of claim 3, wherein the detected subset of the plurality of keys that is most commonly utilized on the mobile computing device is displayed closer to the circular central key within the graphical substantially circular keypad than the subset of the plurality of keys that is least commonly utilized on the mobile computing device in the default key layout as modified according to the automatic optimizations, unless prevented by precedence of the user augmentations over the automatic optimizations in modifying the default key layout.

5. The method of claim 3, further comprising:

the mobile computing device providing an option to a user to disable the automatic optimizations from modifying the default key layout.

6. The method of claim 5, wherein the mobile computing device providing the option to the user to disable the automatic optimizations from modifying the default key layout comprises the mobile computing device providing the option to the user to disable the automatic optimizations from modifying the default key layout for an application on the mobile computing device.

7. The method of claim 1, further comprising:

in response to a user switching from a first application to a second application on the mobile computing device, the mobile computing device switching a layout of the graphical substantially circular keypad for the first application to an optimized layout of the graphical substantially circular keypad for the second application.

8. The method of claim 1, wherein the subset of the plurality of keys that is least commonly utilized on the mobile computing device comprises a shift key, and a caps lock key.

9. The method of claim 2, further comprising:

before the mobile computing device analyzing the usage of the plurality of keys, the mobile computing device recording the usage in a data storage location as a user enters text into the mobile computing device.

10. The method of claim 1, further comprising:

the mobile computing device modifying another layout of the graphical substantially circular keypad by relocating another subset of the plurality of keys based on usage patterns;

wherein the relocating of the subset of the plurality of keys based on usage patterns optimizes key placement for keys that are frequently used during use of a first application on the mobile computing device; and wherein the relocating of the another subset of the plurality of keys based on usage patterns optimizes key placement for keys that are frequently used during use of a second application on the mobile computing device.

11. The method of claim 10, wherein the first application is one of a hypertext markup language (HTML) editing program and a chat client, and wherein the second application is another one of the HTML editing program and the chat client.

12. A data processing apparatus comprising:

a processor;

a display device coupled to the processor; and a computer-usable storage device coupled to the processor, the computer-usable storage device storing instructions executable by the processor to implement a method comprising:

the processor displaying a graphical substantially circular keypad comprising a plurality of keys on the display device, wherein the plurality of keys comprises a space key and an enter key, and wherein the processor displaying the graphical substantially circular keypad comprises:

the processor displaying a circular central key within a center of the graphical substantially circular keypad, wherein the circular central key is one of the space key and the enter key; and the processor displaying the plurality of keys other than the circular central key in a default key layout as modified according to automatic optimizations that are retained in settings in the data processing apparatus, wherein the displayed plurality of keys other than the circular central key radiate outwardly from the circular central key;

the processor detecting a subset of the plurality of keys that is most commonly utilized on the data processing apparatus, and a subset of the plurality of keys that is most commonly utilized in combination on the data processing apparatus, wherein the detected subset of the plurality of keys that is most commonly utilized on the data processing apparatus and the detected subset of the plurality of keys that is most commonly utilized in combination on the data processing apparatus are displayed closer to the circular central key within the graphical substantially circular keypad than a subset of the plurality of keys that is least commonly utilized on the data processing apparatus in the default key layout as modified according to the automatic optimizations; and the processor modifying a layout of the graphical substantially circular keypad by relocating a subset of the plurality of keys based on usage patterns.

13. The data processing apparatus of claim 12, wherein the method further comprises:

the processor analyzing a usage of the plurality of keys in order to detect the subset of the plurality of keys that is most commonly utilized on the data processing apparatus and the subset of the plurality of keys that is most commonly utilized in combination on the data processing apparatus.

14. The data processing apparatus of claim 12, wherein the method further comprises:

in response to a user switching from a first application to a second application on the data processing apparatus, the processor switching a layout of the graphical substantially circular keypad for the first application to an optimized layout of the graphical substantially circular keypad for the second application.

15. The data processing apparatus of claim 12, wherein the subset of the plurality of keys that is least commonly utilized on the data processing apparatus comprises a shift key and a caps lock key.

16. The data processing apparatus of claim 12, wherein the method further comprises:
the processor modifying another layout of the graphical substantially circular keypad by relocating another subset of the plurality of keys based on usage patterns;
wherein the relocating of the subset of the plurality of keys based on usage patterns optimizes key placement for keys that are frequently used during use of a first application on the data processing apparatus; and
wherein the relocating of the another subset of the plurality of keys based on usage patterns optimizes key placement for keys that are frequently used during use of a second application on the data processing apparatus.

17. The data processing apparatus of claim 16, wherein the first application is one of a hypertext markup language (HTML) editing program and a chat client, and wherein the second application is another one of the HTML editing program and the chat client.

18. A computer-usable storage device having computer executable instructions stored therein, the computer executable instructions, executable by a processor of a data processing apparatus to implement a method comprising:
the processor displaying a graphical substantially circular keypad comprising a plurality of keys on a display device of the data processing apparatus, wherein the plurality of keys comprises a space key and an enter key, and wherein the processor displaying the graphical substantially circular keypad comprises:
the processor displaying a circular central key within a center of the graphical substantially circular keypad, wherein the circular central key is one of the space key and the enter key; and
the processor displaying the plurality of keys other than the circular central key in a default key layout as modified according to automatic optimizations that are retained in settings in the data processing apparatus, wherein the displayed plurality of keys other than the circular central key radiate outwardly from the circular central key;
the processor detecting a subset of the plurality of keys that is most commonly utilized on the data processing apparatus, and a subset of the plurality of keys that is most commonly utilized in combination on the data processing apparatus, wherein the detected subset of the plurality of keys that is commonly utilized on the data processing apparatus and the detected subset of the plurality of keys that is most commonly utilized in combination on the data processing apparatus are displayed closer to the circular central key within the graphical substantially circular keypad than a subset of the plurality of keys that is least commonly utilized on the data processing apparatus in the default key layout as modified according to the automatic optimizations; and
the processor modifying a layout of the graphical substantially circular keypad by relocating a subset of the plurality of keys based on usage patterns.

19. The computer-usable storage device of claim 18, wherein the method further comprises:
the processor analyzing a usage of the plurality of keys in order to detect the subset of the plurality of keys that is most commonly utilized on the data processing apparatus and the subset of the plurality of keys that is most commonly utilized in combination on the data processing apparatus.

20. The computer-usable storage device of claim 18, wherein the method further comprises:
in response to a user switching from a first application to a second application on the data processing apparatus, the processor switching a layout of the graphical substantially circular keypad for the first application to an optimized layout of the graphical substantially circular keypad for the second application.

21. The computer-usable storage device of claim 18, wherein the subset of the plurality of keys that is least commonly utilized on the data processing apparatus comprises a shift key and a caps lock key.

22. The computer-usable storage device of claim 18, wherein the method further comprises:
the processor modifying another layout of the graphical substantially circular keypad by relocating another subset of the plurality of keys based on usage patterns;
wherein the relocating of the subset of the plurality of keys based on usage patterns optimizes key placement for keys that are frequently used during use of a first application on the data processing apparatus; and
wherein the relocating of the another subset of the plurality of keys based on usage patterns optimizes key placement for keys that are frequently used during use of a second application on the data processing apparatus.

23. The computer-usable storage device of claim 22, wherein the first application is one of a hypertext markup language (HTML) editing program and a chat client, and wherein the second application is another one of the HTML editing program and the chat client.

* * * * *